United States Patent [19]
Mohan et al.
[11] 3,813,523
[45] *May 28, 1974

[54] PITCH MATCHING DETECTING AND COUNTING SYSTEM

[75] Inventors: William L. Mohan; Samuel P. Willits, both of Barrington, Ill.
[73] Assignee: Spartanics, Ltd., Palatine, Ill.

[ * ] Notice: The portion of the term of this patent subsequent to May 25, 1988, has been disclaimed.
[22] Filed: May 24, 1971
[21] Appl. No.: 146,227

Related U.S. Application Data

[63] Continuation-in-part of Ser. No. 780,367, Dec. 2, 1968, Pat. No. 3,581,067.

[52] U.S. Cl. ......... 235/92 SB, 235/92 R, 235/92 V, 235/92 PB
[51] Int. Cl. .......... G06m 9/00
[58] Field of Search ....... 235/92 V, 92 SB; 250/224, 250/229

[56] References Cited

UNITED STATES PATENTS 3,422,274 1/1969 Coan .......... 250/224
3,581,067 5/1971 Willits .......... 235/92 SB
3,692,983 9/1972 Cucciati .......... 235/61.11 E

OTHER PUBLICATIONS

Philip E. Tobias, Fotocount-A Cardboard Edge Counter, Technical Assn. of the Graphic Arts, pp. 238-247, 1964.

*Primary Examiner*—Paul J. Henon
*Assistant Examiner*—Robert F. Gnuse
*Attorney, Agent, or Firm*—Jacque L. Meister

[57] ABSTRACT

An apparatus for stacked sheet-like materials having low or ambiguous edge contrast characteristics associated with individual ones of the stacked sheets. For low reflectance materials the sensor array is used as a current generator working into a substantially zero impedance circuit to maximize bandwidth. Where ambient levels are high sensors having different spectral response characteristics are used to detect whether the sensor array is being exposed to ambient or is generating counting data. Where contrast gradients are very low logic circuitry detects the absence of missed count data and injects synthesized data in its place.

20 Claims, 13 Drawing Figures

WILLIAM L. MOHAN
SAMUEL P. WILLITS
INVENTOR.

BY Jacques L. Meister
ATTY.

WILLIAM L. MOHAN
SAMUEL P. WILLITS
INVENTOR.
BY [signature]
ATTY.

WILLIAM L. MOHAN
SAMUEL P. WILLITS
INVENTOR.
BY Jacques L. McEwan
ATTY.

WILLIAM L. MOHAN
SAMUEL P. WILLITS
INVENTOR.

BY [signature]
ATTY.

WILLIAM L. MOHAN
SAMUEL P. WILLITS
INVENTOR.
BY Jacque L. McEwen (signature)
ATTY.

WILLIAM L. MOHAN
SAMUEL P. WILLITS
INVENTOR.
BY Jacques L. Meister
ATTY.

WILLIAM L. MOHAN
SAMUEL P. WILLITS
INVENTOR.

BY [signature]
ATTY.

WILLIAM L. MOHAN
SAMUEL P. WILLITS
INVENTOR.

BY [signature]
ATTY.

PITCH MATCHING DETECTING AND COUNTING SYSTEM

REFERENCES TO RELATED APPLICATION

This application is a Continuation-in-Part of the application of WILLIAM L. MOHAN and SAMUEL P. WILLITS, Ser. No. 780,367, filed Dec. 2, 1968, titled PITCH MATCHING DETECTING AND COUNTING SYSTEM now U.S. Pat. No. 3,581,067, issued May 25, 1971.

BACKGROUND OF THE INVENTION

The field of the invention is generally related to article counting and more particularly to improvements in the sensing apparatus and associated electrical and mechanical elements used in counting stacked objects.

In the aforementioned Mohan et al. application, there is described apparatus for counting plural stacked objects. In particular, special illumination systems, maintenance of particular relationships between sensor size and stacked objects size and, particular circuitry combined under the conditions described in that application, enable high speed counting of stacked objects having relatively low contrast gradients between adjacent ones of the stacked objects.

While the apparatus of the parent Mohan application solved many problems and in most instances provided an excellent method for stacked object counting, with some materials and material thickensses, high speed counting with high count reliability were difficult to achieve. Among the difficult materials are thin paper, glass, metals with crystalline or granular edge characteristics and very thick materials having plural and random brightness gradients for each material thickness.

SUMMARY OF THE INVENTION

It is accordingly a principal object of the invention to improve counting speed and reliability with the aforesaid difficult materials and thicknesses. This object is achieved in the case of low reflectance materials by using the sensor as a current generator working into a substantially zero ohm circuit and thus maximizing band width and hence, counting speed. In the case of granular or crystalline edge characteristics, special arrangements of the light source, lens elements and sensor result in the surface appearing to the sensor as uniformly bright and equivalent to a diffused reflector.

To overcome problems encountered in the counting of very thick materials and those caused by very high ambient illumination levels, a sensor cell pair is utilized, the two sensors having actually or effectively substantially different spectral response characteristics. When the two sensors are electrically connected in differential, polarity of the output data reverses between ambient exposure alone and stack counting. This polarity reversal is utilized to clamp out any counting signals as long as the condition persists. Thus, exposure of the sensors to high ambient levels as may be the case when they are not being used to count, is used to block any count until the ambient level falls to that normally encountered during counting. In certain instances and particularly where very thin materials are stacked for counting, riffling to separate the edges using air or other means can be used to enhance both edge contrast gradients and signal to noise ratios. Where little or no contrast gradient is present between adjacent stacks, means are provided for detecting the occurrence of missed counts and for injecting synthesized data to replace the missed count. In still other embodiments it has proven useful to utilize the light source as a means for achieving pitch match.

DESCRIPTION OF THE PREFERRED EMBODIMENTS

Figure 1:
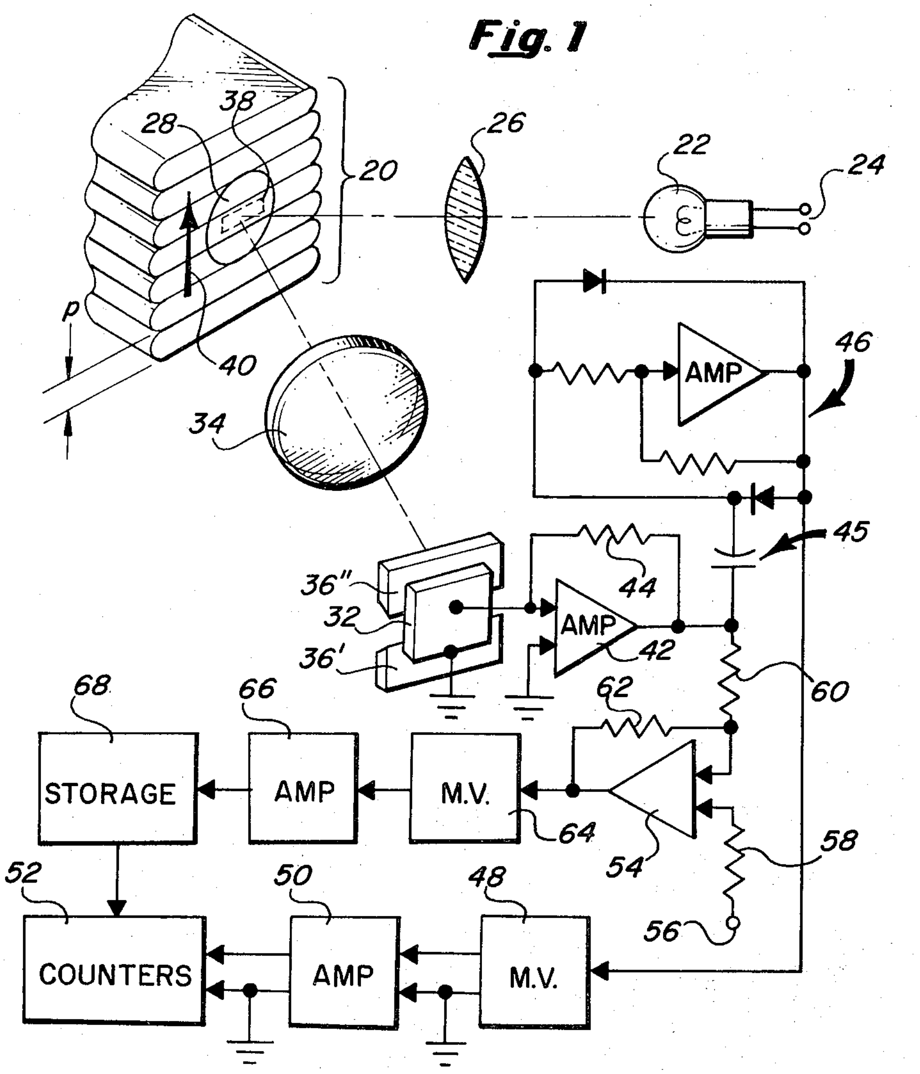
FIG. 1 is a schematic representation, partially in perspective and partly in block diagram form showing in some detail, means for improving the frequency response of the inventive system.

FIG. 1 illustrates in schematic form principal components of a simple form of the improved inventive detecting system. Objects having sheet-like edge characteristics are shown at 20 stacked adjacent, one upon another, and with their edges proximately in alignment with one another. As explained in the parent application, the individual sheets each have a space varying reflectance signature and these individual signatures may be used in counting the many sheets comprising the stack 20. The signatures are, however, frequently very much like one another and additionally, often are nearly lost in spurious reflectance noise due to characteristics of the edges themselves. The parent application discloses means for improving upon these signal characteristics, principally by pitch-matching the width of one or more sensors to that of individual sheets in the stack. However, even though these means are highly effective for materials varying between quite thin and quite thick (small to large pitch $p$) or even those having edges with non-lambertian reflectance characteristics, further improvements to improve frequency response and counting accuracy are desirable and are provided by the improved pitch matching detecting and counting system of this invention as revealed in the following description.

Light source 22 excited by D.C. source 24 is focused by condensing lens 26 to form lighted area 28 upon the edges of the stacked sheets 20. The image of lighted area 28 is formed by objective lens 34 substantially in the plane of sensor array 32. Masks 36' and 36'' form a long narrow slit having its major axis parallel to the boundary line between adjacent sheets. The portion of sensor 32 not masked is imaged on the stacked material at 38.

The light source 22, optical elements, 26 and 34 and sensor array 32 (with masks 36' and 36'') are mounted in a suitable frame and caused to traverse the stack in the direction of arrow 40. Since silicon photovoltaic cells are small in size and possessed of low impedance which matches that of transistorized signal processing circuits, they are generally preferred for use in sensor array 32. However, when such cells are used for counting very low reflectance material, the internal resistance of the cells can become quite high (approximately ½ megohm) since the cell is essentially operating in the dark. Under these circumstances, the shunt capacity of the cell and its associated wiring can have a marked detrimental effect on sensor electrical response to the rapid changes in contrast that occur when the sensor is caused to traverse the stack 20 at a rapid rate. It is a feature of this invention that these detrimental effects are reduced to a minimum and largely overcome and the frequency response of the cell improved by the novel circuitry combination of the invention.

To achieve the improved frequency response, the sensor 32 is used as a current generator working into a zero impedance circuit. This result is attained by connecting the output of sensor 32 to operational amplifier 42 and by adjusting feedback resistance 44 to provide sufficient negative feedback to make the operational amplifier circuit appear to the sensor as a zero impedance source. Since the bandwidth or frequency response of the system is based upon the parallel combination of the sensor's internal impedance and its load impedance, it can be seen that the foregoing combination produced a minimum parallel impedance combination and hence, maximum possible frequency response and band width.

The balance of the circuitry of FIG. 1 is similar or identical to that of FIG. 1 of the parent application. The amplifier output signal is coupled to signal stripping circuit 46 through capacitor 45. Stripping circuit 46 produces an output square waveform which reverses for each reversal in the polarity of the incoming wavetrain. The stripped waveform at the output of circuit 46 is further processed in bi-stable multi-vibrator 48, reformed in pulse forming amplifier 50 and applied to decade counters 52 which count the number of sheets in stack 20.

It is a feature of the invention that false counts such as might be encountered if a sheet is missing from the stack 20, can be detected by the circuitry of FIG. 1. When such a situation is encountered, the output of amplifier 42 drops and with it that of brightness reference amplifier 54 to which it is coupled through resistor 60. Whenever the output of amplifier 54 drops below a reference level determined by resistor 58 and the potential applied to terminal 56, monostable multivibrator 64 is tripped and generates a square output pulse. This pulse is processed in pulse forming amplifier 66 and passed to storage resistor 68. This pulse is used to blank out the next counting pulse appearing at the input to counter 52 and hence, corrects the count to allow for the missing sheet in the stack.

Figure 2:
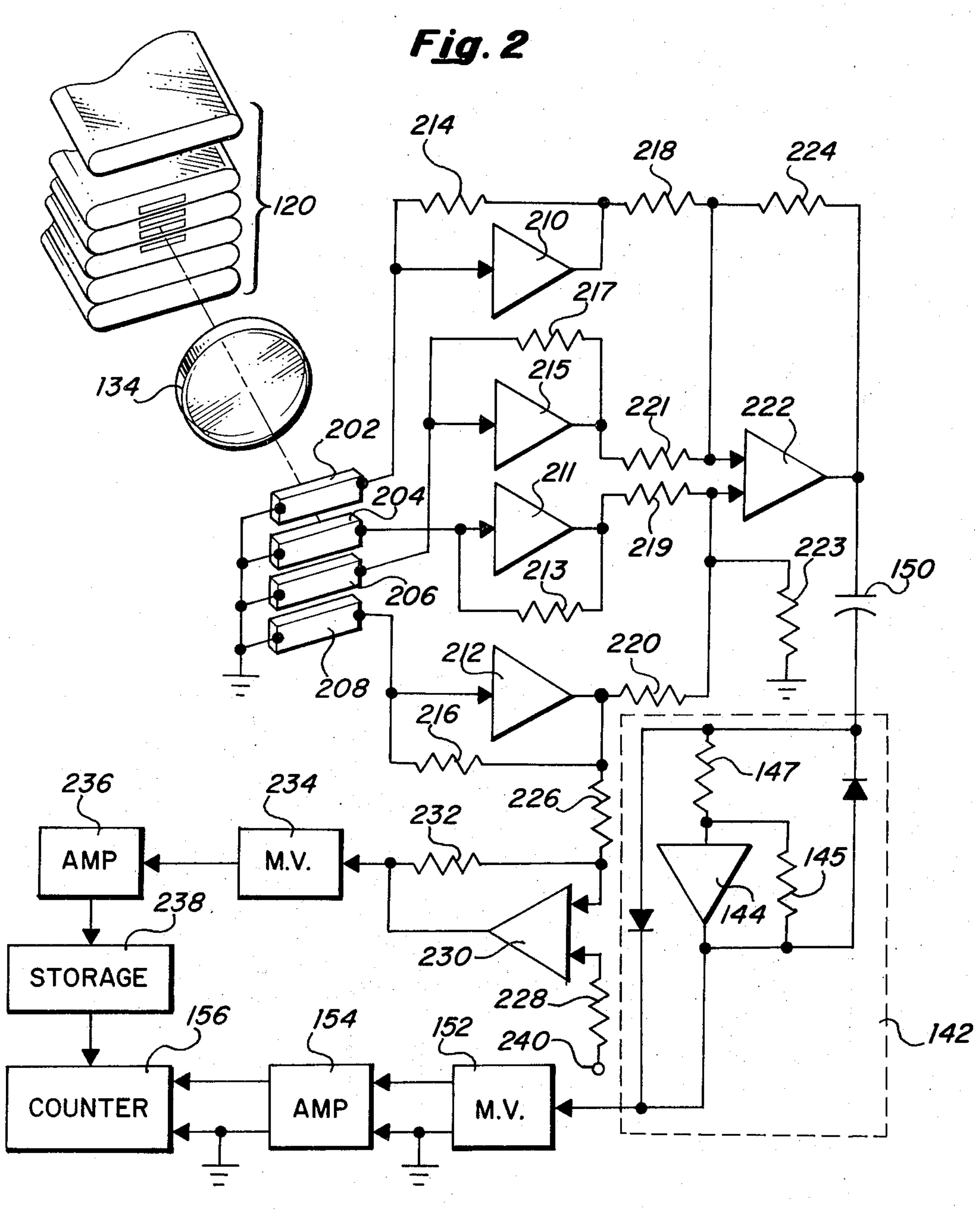
FIG. 2 is a mechanical-electrical schematic in both perspective and block diagram form showing a preferred inventive embodiment with means for improving both frequency response characteristics and for effecting count correction.

In keeping with the principles of this invention where multiple sensors are employed the output of each sensor is applied to a zero impedance load to improve its frequency response. Thus, where four sensors make up the array as in FIG. 2, each has its output applied to an operational amplifier and each of the operational amplifiers 210, 211, 212, and 215, has its respective negative feedback resistor 214, 217, 213, and 216, adjusted to achieve the effect of a zero impedance load.

The output of the four operational amplifiers is coupled into differential amplifier 222 through summing resistors 218, 219, 220 and 221, resistor 224 providing a feedback around amplifier 222, resistor 223 to ground being chosen to enable best common mode rejection. The output signal of amplifier 222 is equivalent to that of a two sensor array such as that of FIG. 4 or 6 of the parent application. This output signal is processed in stripping circuit 142, bistable multivibrator 152, pulse forming amplifier 154 and counter 156 in a manner identical to that described above for FIG. 1. After amplification in operational amplifier 212, the output signal of sensor 208 is processed by a brightness analyzing circuit comprising amplifier 230 having a reference voltage applied at terminal 240 in the same manner and for the same purpose as the equivalent circuit elements of FIG. 9 of the parent application.

As set forth above, certain stacked materials when viewed with narrow field illumination, have random irregular specular reflection characteristics rather than the lambertian reflection characteristics preferred in the practice of the parent application. Such materials typically have a crystalline or similar structure and consequently have a multitude of highly reflective facets. The relative plane of the individual facets as compared to the average plane of the surface of the edge made up of the facets, is entirely unpredictable and when illuminated with narrow field source illumination, this type of edge appears to sparkle and thus degrades the optical signature indicative of a stacked element.

By definition, the illumination of an elementary surface area $\Delta$ A due to a point source is proportional to the luminous intensity of the source in the direction of the surface and the cosine of the angle between this direction and the normal to the surface element. Also, it is inversely proportional to the square of the distance between the source and the surface. When the reflectance from an elementary surface area $\Delta$ A illuminated by a point source appears equally bright when viewed from any direction, then the surface is called a uniform diffusing surface. Since this is generally not the case for the edges of crystalline materials whose reflective elements are in many random planes relative to the source, the edge will have random reflections and thus appear to sparkle when so illuminated. Since this sparkle yields, or tends to yield, electro-optical signatures or signals indicative of plural edges where only one exists, it has heretofore been impossible to get an accurate electro-optical count of such materials when tightly stacked.

Figures 3, 4:
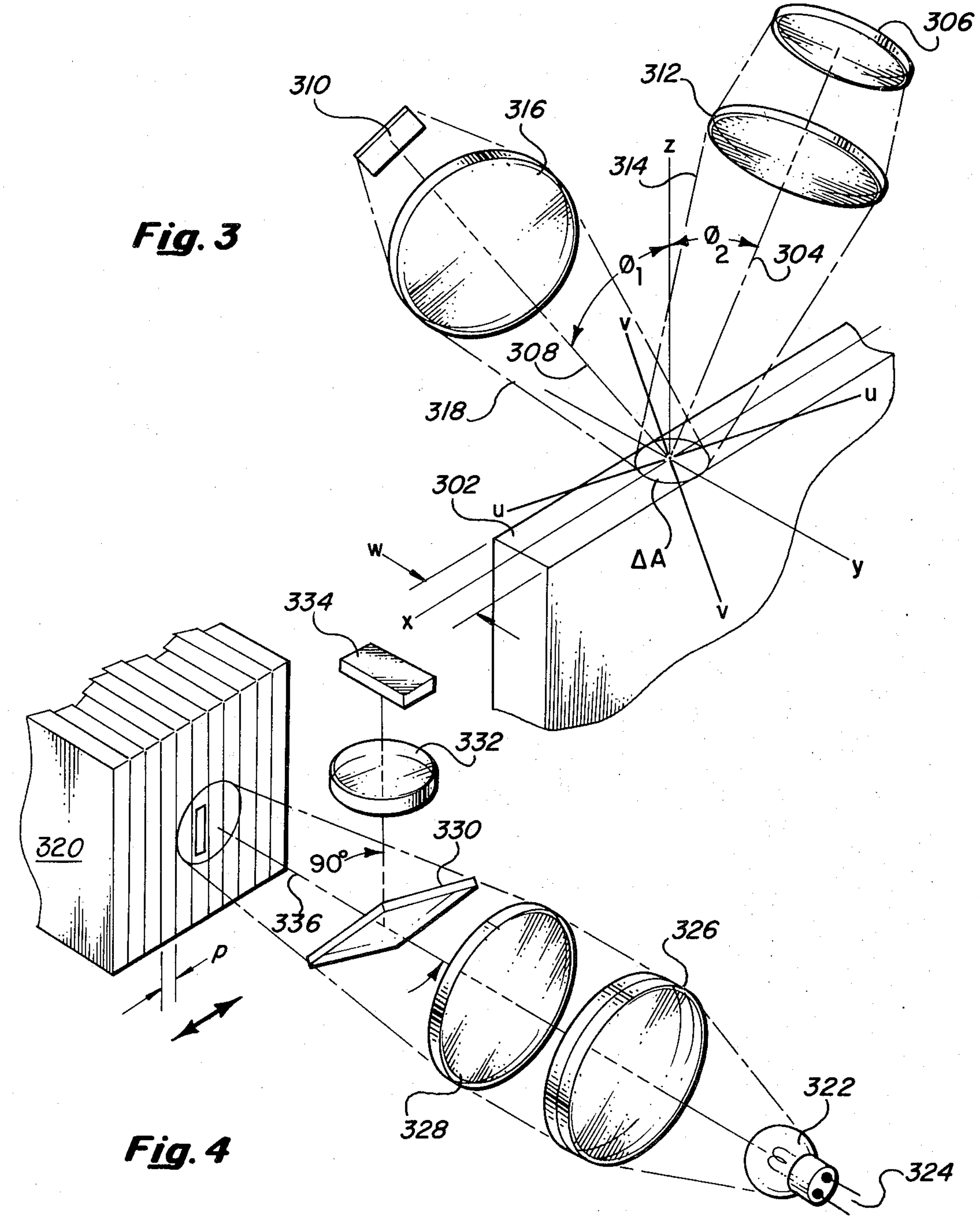
FIG. 3 is a mechanical schematic in enlarged detail showing the relationships of optical and electro-optical components relative to the stacked material.
FIG. 4 is a mechanical-optical schematic in enlarged detail showing an arrangement of optical elements somewhat similar to FIG. 3.

It is a feature of the invention that a large majority of the individual facets comprising a faceted edge are utilized to give such an edge at least the appearance of diffused reflections. This result is achieved by utilizing particular included viewing angles and particular illumination sources as illustrated in FIG. 3. There is illustrated a sheet 300 having a top edge 302. Sheet 300 is a crystalline substance and each edge of the sheet is consequently comprised of a plurality of reflective facets. Each of these facets in edge 302 may be considered to be an individual area Δ A lying in a discreet plane, *u, v*, which plane in turn has an arbitrary relationship to the average plane X, Y, of edge 302. If the optical axis 304 of illumination source 306 and the optical axis 308 of sensor array 310 are both located in the Z plane which is perpendicular to edge 302 and the angles $\phi_1$ and $\phi_2$ relative to the normal Z axis are equal and opposite, then there will be specular reflection detected by sensor 310 from the surface element of facet Δ A if its *u, v*, plane lies in a plane coincident to the X, Y, plane.

If the plane of element Δ A is inclined to the X, Y, plane at some random angle between parallel to the X, Y plane and normal to it, it becomes necessary to have light rays converging on the facet of area Δ A from a large included angle in order to assure there being a specular reflection from the surface of the element Δ A in the direction of the optical axis 308. It is a particularly advantageous feature of the invention that this result is achieved by the arrangement of elements shown in FIG. 3. There, the light source 306 is uniformly diffuse and large enough to fill the aperture of condensing lens 312. Lens 312 has a focal length of convergence equal to or smaller than its diameter. It has been discovered that this arrangement will produce a plurality of rays 314, for example, that have extremely varied and steep angles relative to the X, Y plane. This insures that there will be at least some regular or specular reflection off of facet Δ A, for all reasonable angles of inclination of its plane, *u, v*, relative to the X, Y, plane.

The foregoing discussion of means to achieve specular reflection from a single facet Δ A, is equally applicable to a plurality of facets if the lens 312 diameter is maintained large relative to the width W while maintaining its focal length equal to or smaller than its diameter. It has been found that the diameter of lens 312 should be greater than 5 times sheet width W. Of course, it remains necessary to maintain the angular relationships noted above but, if they are maintained and the incident radiation is thus arranged, sensor array 310 "sees" what is the equivalent of a diffused reflector. With sparkle thus eliminated, electro-optical response of the system is greatly improved. Of course the response of the optical system can be further improved by utilizing a "fast" objective lens 316. Such a lens enables collection of far-off axis rays such as 318 in addition to those more nearly parallel to its optical axis 308.

FIG. 4 illustrates another method of achieving the appearance of diffuse reflectance and hence, improved signature response when scanning the multi-faceted edges of stack 320. Here, the angles of incidence and reflection not only are equal, they are coincident. Radiation source 322 is excited from source 324. Lens 326 collimates the radiant energy from the radiation source and condensor 328 focuses the radiation into a bundle whose characteristics, size and angle wise were described above relative to FIG. 3. A beamsplitter 330 interposed in this optical path permits objective lens 332 to image sensor array 334 upon the edges of stack 320. The particular advantage of this optical arrangement compared to that of FIG. 3 is that since the optical axis 336 can be maintained normal to stack 320, a greater depth of focus can be achieved for the sensor 334. Of course, the desirability and the requirements and methods for achieving pitch match between the sensor array and the pitch *p* of the sheets of the stack, remain as described in the parent application.

Figure 8:
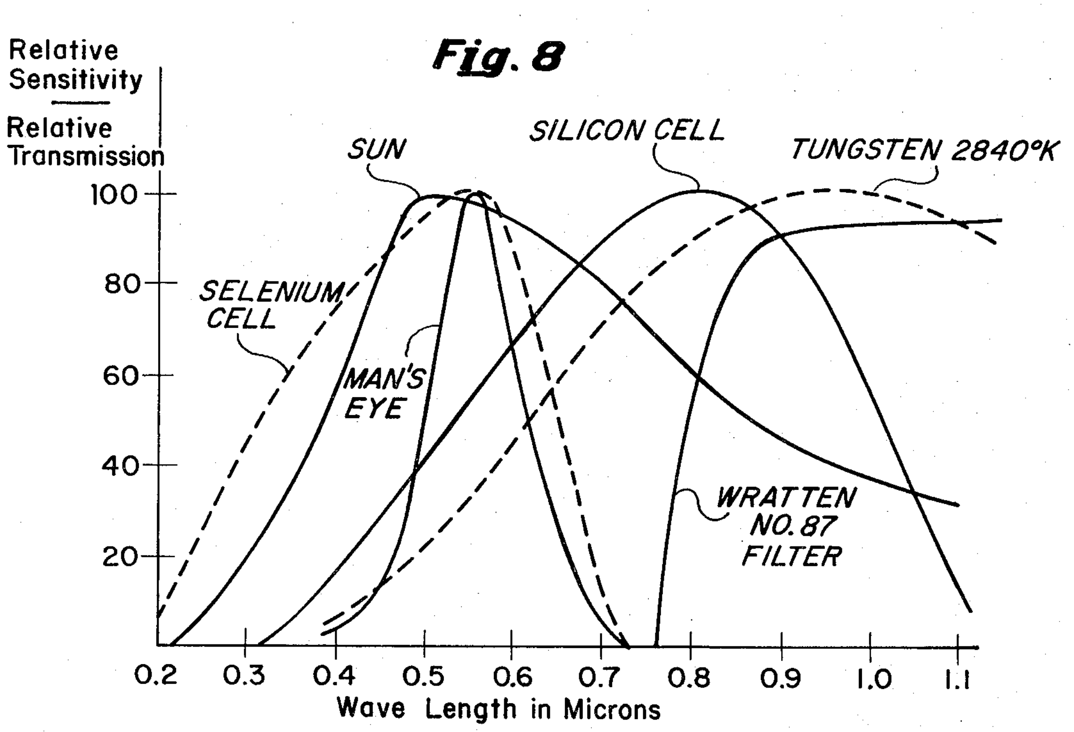
FIG. 8 graphically illustrates the spectral response characteristics of electro-optical elements employed in the practice of the invention as well as of certain ambient surrounds.

One of the features of the counting system of the parent application, is the ability of the differentially connected two cell array there employed to eliminate false data generated by out of focus ambient light falling on the sensor array — particularly when the array is moved past the edge of the stack being counted and views a bright background. This background can either be man made or solar and has energy spectrums as shown in FIG. 8 and extending from the ultra violet through the visible spectrum into the infrared. Another feature of the two sensor array, is its ability to generate enhanced signal counting data from edges that reflect only a brightness gradient from one edge to the next, with no visible dark separation between sheet edges.

These very real advantages of the two sensor array can however prove to be a disadvantage when counting very thick stacked elements such as folded corrugated boxes. On occasion these folded boxes are more than one inch thick and consequently there often are several pronounced contrast gradients associated with a single edge thickness as well as a dark space between adjacent sheets. These conditions can and often do produce extra and false count data.

To overcome these latter types of difficulties, a sensor array having but one element can be used. However, the single element array is unable to reject ambient background illumination and as pointed out above, this in itself can cause false counts. It is an inventive feature that the modified sensor array of FIG. 5 overcomes both the disadvantages of the single and double sensor array of the prior art and enables rapid error free counting of very coarse elements.

Figure 5:
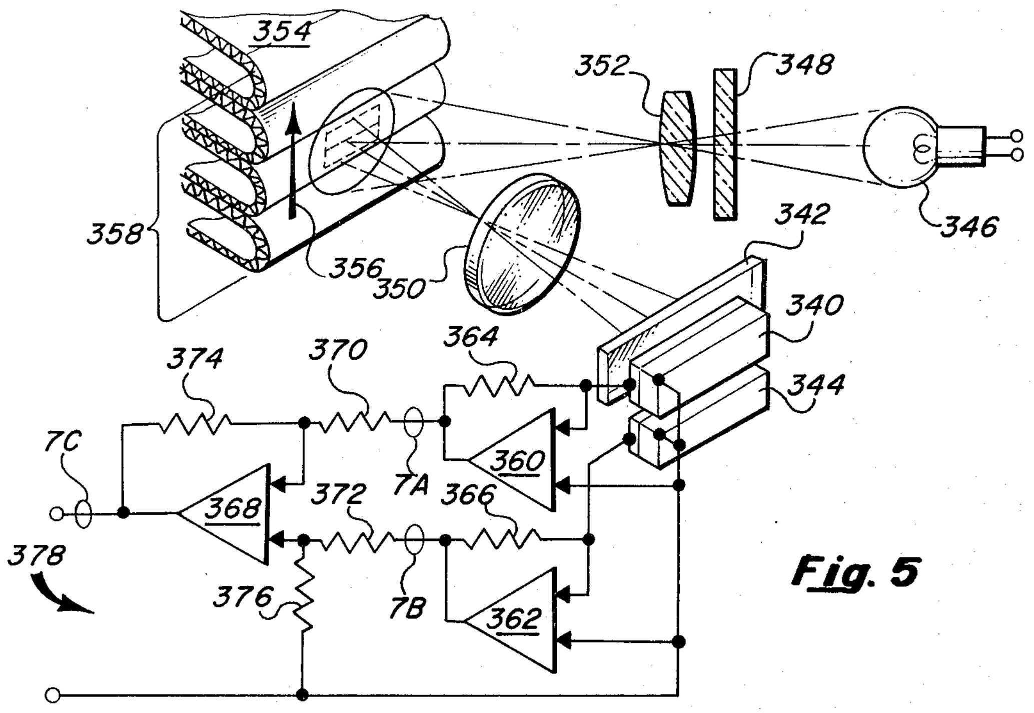
FIG. 5 is a mechanical-electrical schematic illustrating yet another embodiment of the improved inventive system.

In FIG. 5, the sensor array is comprised of two sensors 340 and 344, sensor 340 being a silicon photovoltaic element. Positioned between sensor 340 and stacked folded corrugated sheets 358 is an infrared passing filter 342 such as a Wratten type No. 87. Lamp 346 also is filtered by an infrared filter of the Wratten No. 87 type. The spectral response characteristics of sensors 340 and 344 and filter 342 as well as that of tungsten lamp 346 operating at 2,800°K, are shown in FIG. 8. An examination of these spectral characteristics reveals that selenium sensor 344 is only sensitive to energy in the visible portion of the spectrum whereas silicon sensor 340 in conjunction with filter 342 is only sensitive to energy in the nonvisible red end of the spectrum. As can be seen from these spectral characteristics, the output energy of the lamp 346 received by sensor 340 is primarily in the near infrared spectral region and essentially matches the response requirement of the filtered sensor 340.

As shown, the filtered output of lamp 346 is imaged on the stack 358 by lens 352 and the sensor array 340–344 is imaged at the same area by lens 350 which advantageously also effects the desired pitch matching in accord with the principles of the parent application. The two sensors 340 and 344 are electrically connected in differential with their sensitivity so adjusted that a negative potential, amplitude modulated signal will be generated by the array if it is caused to traverse the stack 358 and the stack is primarily illuminated by filtered source 346. If the array traverses the stack in the direction of arrow 356, sensor 344 will be the first to come off the stack and "see" the ambient surround of daylight or man-made illumination. As soon as sensor 344 does "see" this ambient, the polarity of the signal at the output of differential amplifier 368 will immediately reverse. As pointed out below this polarity reversal can be used as a trigger to actuate a clamp which blocks subsequent counting for as long as the polarity remains reversed.

The outputs of sensors 340 and 344 are connected to low drift operational amplifiers 360 and 362, respectively. Each of the amplifiers 360 and 362 has associated with it a feedback resistor 364 and 366, respectively. These amplifiers preserve the waveform present at their inputs while raising its potential and simultaneously, have their feedback characteristics adjusted to appear to the sensor as a zero impedance load to enable enhanced frequency response in the manner described above. The outputs of amplifiers 360 and 362 are coupled into differential amplifier 368 through equal summing resistors 370 and 372. Resistor 374 provides a feedback path around amplifier 368, resistor 376 to ground advantageously being of the same value as resistor 374 to enable best common mode rejection. Amplifier 368 combines its input signals and provides a differentially combined output signal at terminal 378, the waveforms present in the outputs of the three amplifiers being shown in FIG. 7, the lettered indication in FIG. 6 corresponding to the same lettered signal characteristics shown in FIG. 7.

Figure 6:
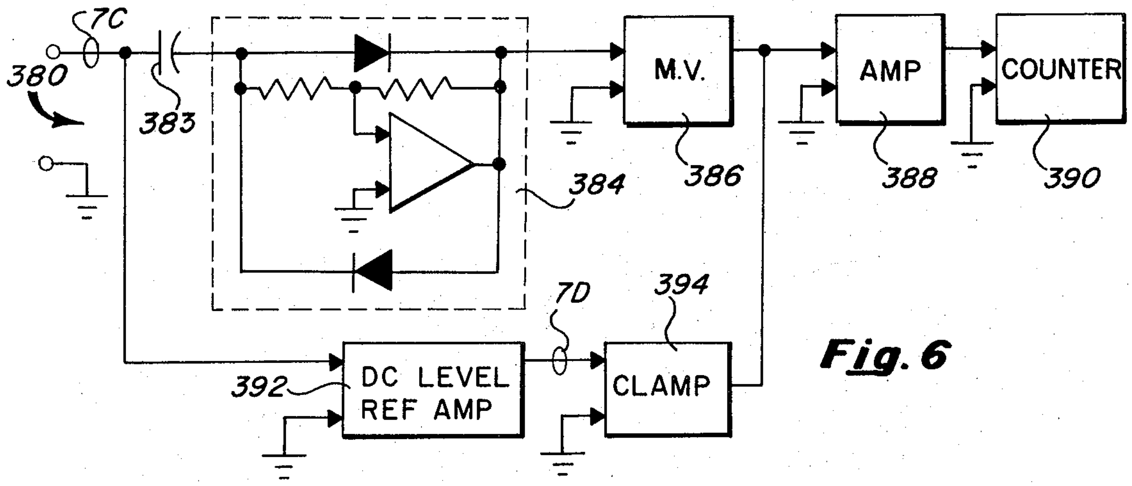
FIG. 6 illustrates in schematic and block diagram form, circuitry useful with the system of FIG. 5.
Figure 7:
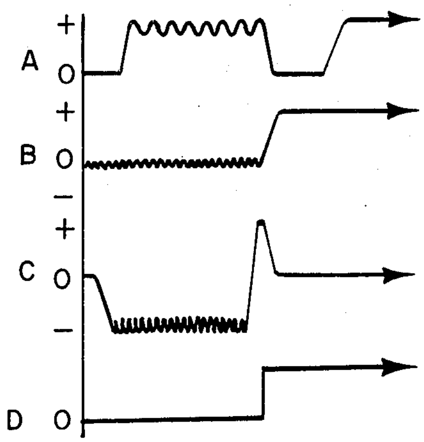
FIG. 7 illustrates waveforms present in various parts of the circuitry of FIGS. 5 and 6.

A typical and presently preferred system configuration especially useful with the sensor arrangement of FIG. 5, is shown in FIG. 6. The output of amplifier 368 of FIG. 5 is coupled into the circuitry of FIG. 6 at terminal 382. This signal is in turn coupled into signal stripping circuit 384 by capacitor 383. Circuit 384 is substantially identical to that shown and described in the parent application in connection with the subcircuit 42 of its FIG. 1. By a novel combination of circuit parameters there described, the output of signal stripping circuit 384 is caused to comprise a recurrent square wave which reverses each time there is a slight reversal in the incoming waveform. The output square wave is further processed to facilitate counting by counter 390 by being passed through miltivibrator 386 and amplifier 388. This further processing results in a spiked wavetrain possessing ideal counting characteristics, and eminently suitable for the input to decade counter 390.

As described above, it is a feature of the invention that means be provided to detect the presence of ambient illumination upon the sensor array and to thereupon inhibit further counting. This feature is achieved as shown in FIG. 6 wherein the input to stripping circuit 384 is also coupled into D.C. level reference amplifier 392. Amplifier 392 recognizes the change in polarity of the sensor array output signal that occurs when sensor 344 (FIG. 5) "sees" the ambient surround. When this condition is recognized by amplifier 392, it is triggered "on" and generates an output signal, as long as the polarity signal that triggers it is present. Clamp 394 is actuated which in turn clamps out any signal data appearing at the output of miltivibrator 386. From the foregoing it can be seen that the invention provides a novel means for simultaneously enhancing count accuracy in pitch match counting apparatus and means for eliminating the effect of ambient background illumination — thus enhancing overall frequency response and counting accuracy of such apparatus.

Less than desirable electro-optical signature characteristics have also been encountered when utilizing the system of the parent application to count very low contrast sheets. Further, as sheet thickness goes down, visible contrast gradients also tend to decrease while, simultaneously it becomes more difficult to effect a pitch match between apparent sensor array thickness and stacked element thickness. It is a feature of the invention that it has been discovered that an air blast directed at such low contrast stacked sheets in the area being counted, will materially improve contrast gradients and counting accuracy.

Figure 9:
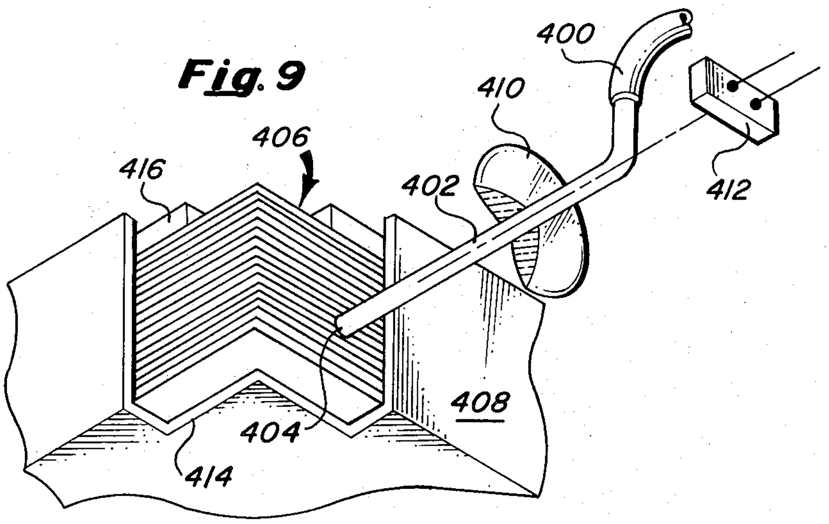
FIG. 9 is a mechanical schematic of a sensor configuration similar to that of FIGS. 1, 2, and 3, but further modified to enhance frequency response and signal to noise ratio.

An invention embodiment employing an air blast to enhance contrast gradients is shown in FIG. 9. As shown, air is introduced into the pneumatic system at flexible coupling 400 from whence it traverses conduit 402 and nozzle 404 to impinge upon thin stacked material 406. Material 406 is stacked in a holding fixture 408 which incorporates a cut away corner to facilitate counting, the size of the cut being sufficient to enable the sensor of the invention to "see" the stacked material. The bottom edge 414 of the holding fixture is cut away to allow some movement in the bottom sheet of the stacked material when it is subjected to the air blast.

In order to have the impinging air give a relatively stable separating effect to the stacked sheets, it has been discovered that the air stream should be normal to the edge of the stack and as close to the optical axis as possible. It is a feature of the invention that this result can be achieved by passing air conduit 406 through an on-axis orifice in lens 410. Since the conduit is small compared to the total lens diameter, no significant reduction in light gathering properties is experienced while the desirable on-axis alignment of the conduit is insured. In still other embodiments preferred for practical reasons, air conduit 406 is positioned adjacent the lens and impinges on the sheets in the area adjacent that viewed by the lens.

The stability of the separation has been discovered to be limited for most thin (less than 0.015 inch thick) materials by the relationship of nozzle diameter to sheet thickness. For all other than extremely limp materials, it has been discovered that the diameter of nozzle 404 should be between 0.020 and 0.100 inch with the nozzle maintained between a distance of 0.025 to 0.50 inch away from the stacked sheets. In general thin materials require the use of the smaller orifices and closer spacing, thicker materials, larger orifices and greater spacing, the particular combinations depending on the material. For example, 0.020 paper based boxboard is effectively separated for counting by a 0.080 inch diameter orifice located 0.200 inch from the stack and having a pressure head of 20 to 30 p.s.i..

To enable making the pressure on each sheet of the stacked material substantially independent of the weight of the stack, a weight that is heavy relative to the weight of the stacked material 406 is advantageously placed on top of the stack. The weight 416 is recessed in similar fashion to the recess 414 in the bottom of holding fixture 408 for the same reason.

For a stack of material such as 0.004 inch thick paper three inches high, a weight 0.063 pounds per square inch results from the weight of the stack alone. To this is added weight 416 which has been found to be most flexible in application if it is made to have a weight of approximately 0.12 pounds per square inch of stack top surface area.

Air pressure is adjusted to maintain at least six sheets with their edges separated and stable, without buzzing or rapid vibration, to enable maximum frequency response in the system. For sheets varying between 0.003 inches thick and 0.008 inches thick, it has been found that with a nozzle diameter of 0.060 inches and by maintaining a head of 10 p.s.i. at coupling 400 that from 6 to 8 sheets separate at one time and by a distance varying between ½ and full sheet thickness. However, with this setting materials of about 0.003 inch thick tend to vibrate at a frequency of about 5 thousand cycles while 0.008 material vibrated at 2kc. In order not to have this vibration affect counting, the sensor can be set to scan at a linear rate low enough to ensure a large frequency separation between count data and any optical noise generated by sheet vibration. For 0.003 inch thick material, a scan rate of 2 inches per second yields a 600 cycle per second counting signal — adequately separated from the 5kc noise to enable ordinary filtering rejection of the noise.

In each of embodiments shown or described above, pitch matching of sensor array elements to the thickness of a sheet of the stack has been accomplished by varying the effective width of the sensor elements. Illumination of the stack by an external source was provided only to insure a proper and adequate response from the sensor. Obviously however, in the absence of background illumination to which the sensor elements are responsive, the illuminating source can be used to achieve and control the pitch match of the sensor by illuminating only the area on the sheet the sensor should "see" to be pitch matched. Thus even if the sensor image upon the stack is very much thicker or larger than the thickness of a single sheet, if the sheet is illuminated by a beam of light having a length to width ratio identical to those desired of the sensor, a signal is generated that is identical to that of a sensor whose effective width is that of the light beam. However, as discussed in the parent application, such a system employing a single sensor is unable to generate the differential data necessary for common mode rejection and, of course, is incapable of providing the signal enhancement of a multi-sensor system.

Figure 10:
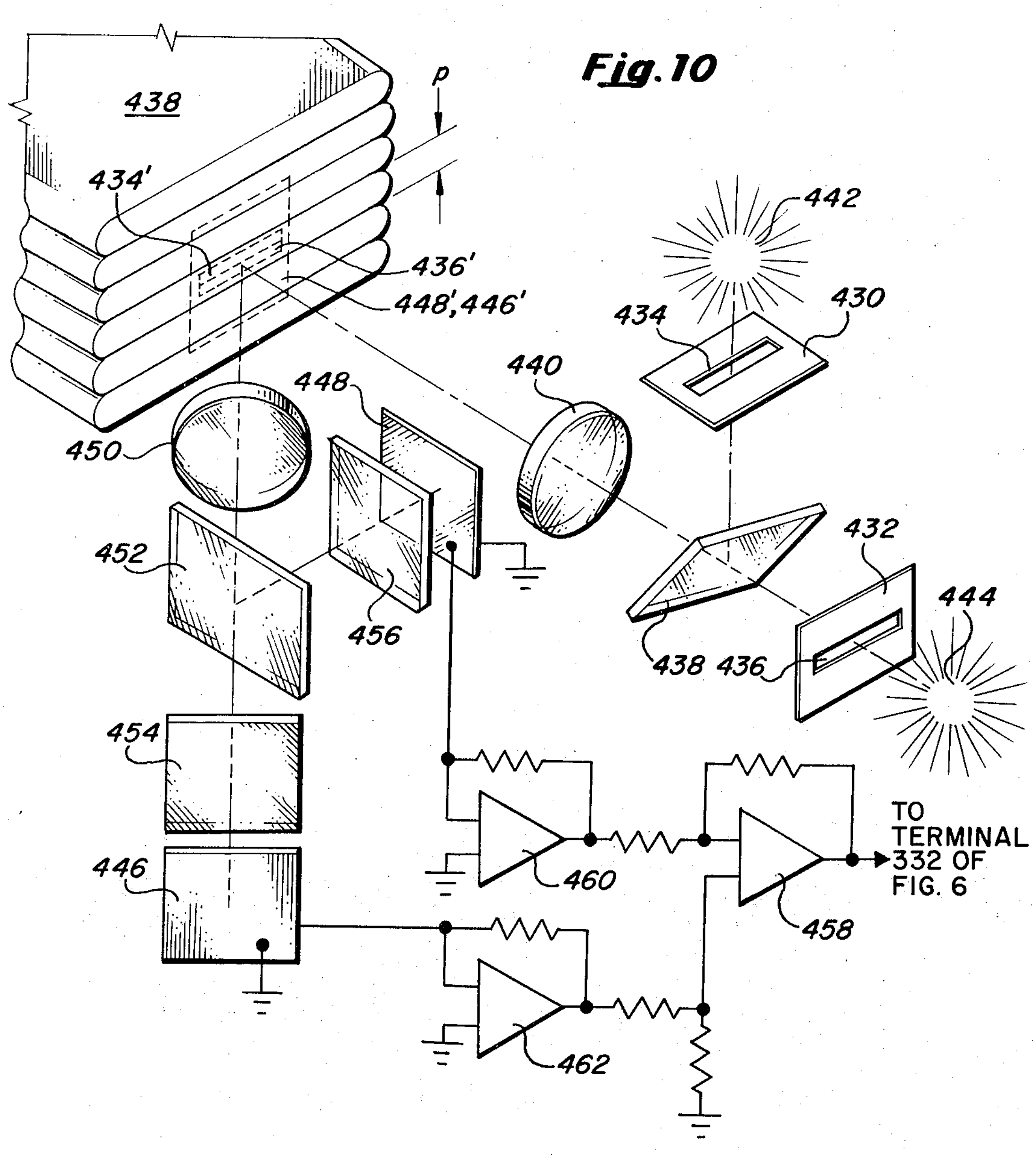
FIG. 10 illustrates in mechanical-optical schematic form a multiple illumination, single sensor configuration of the invention.

It is a feature of the invention that the foregoing limitations of single sensor systems having effective sensor width controlled by the light source are advantageously overcome by the embodiment whose features are illustrated in FIG. 10. Aperture plates 430 and 432 containing slits 434 and 436, respectively, are arranged physically and optically so that the images of slits 434 and 436 are projected upon the edges of stacked objects 438. Beam splitter 438 permits insertion of the image of slit 434 into the optical path of lens 440. Imaging lens 440 is utilized to adjust the width of the slit images 434' and 436' to the thickness "p" of a single sheet in the stack in accord with the criteria for pitch matching described in the parent application. The slits are illuminated by sources 442 and 444 which advantageously may be light emitting diodes (LED) having narrow band spectral emission in two different bands.

Area 446', 448', in addition to the illuminated areas on the stack, 434' & 436' are imaged upon sensors 446 and 448 by means of objective lens 450 and optical beamsplitter 452. Inserted in the optical path of the sensors are band pass filters 454 and 446 which advantageously are matched to the spectral emission characteristics of LED's 442 and 444. With this configuration, the sensor output signals are added differentially in amplifier 458 after having been amplified by their output operational amplifiers 460 and 462. The output signal of amplifier 458 can then be stripped, processed and counted by circuitry similar to that of FIG. 6.

Occasionally materials are encountered which have so little contrast associated with either or both of the sheet edges or the boundaries between sheets, that their is the possibility of counting error due to missing counts. Such errors can be eliminated if missed counts can be detected and added to the count. One method of detecting such missing counts and compensating for them, is illustrated in FIG. 11.

Sensor platform 570 is moved at a constant velocity "v" in the direction of arrow 472 at a substantially fixed distance "d" from the edge of stack 474. Platform 470 is guided in its travel by guide rail 476 and propelled by a linear actuator whose piston 478 is partially shown. Platform 470 carries thereon a sensor array comprising sensor elements 480 and 482, lens 484 and operational amplifiers 486 and 488 with their associated feedback resistors 490 and 492. As in other embodiments, lens 484 is chosen to achieve a pitch match of the sensor image width with the thickness *p*. The amplified output of the sensor elements are coupled into differential amplifier 494 through summing resistors 496 and 498. The output of amplifier 494 is coupled through capacitor 500 to stripper circuit 502 whose output pulse waveform is shaped in bi-stable multivibrator 504 and pulse forming amplifier 506 before being accumulated in counter 508 in the same manner as in the parent application. Brightness reference amplifier 510 is coupled to the output of sensor 482 through resistor 512. A brightness reference voltage is also applied to the input of amplifier 510 through resistor 514 from terminal 516. Resistor 518 provides a feedback path around amplifier 510. The output of amplifier 510 can then be utilized to analyze brightness since in the presence of stacked materials it oscillates about a voltage level determined by the input at terminal 516. Mono-stable multivibrator 520 generates a square output pulse whenever the brightness level output voltage falls below a selected value as when the sensor 482 no longer "sees" the stack.

Count computer 522 continuously samples the output pulse train of multivibrator 504 and generates as an output a D.C. control voltage proportional to the number of pulses per second. This output is maintained constant at the last level generated during any interval where there are no input pulses. Count generator 524 is a voltage controlled, keyed oscillator which generates output pulses at a rate proportional to the D.C. control voltage output of computer 522 and in synchronous coincidence with the input from multivibrator 504. The output pulses of count generator 524 are compared with the pulse train output of multivibrator 504 and the output pulse of brightness multivibrator 520 by logic circuit 526. The pulse output of count generator 524 is coupled to the input of counter 508 by logic circuit 526 whenever there exists a condition of no output from multivibrator 504 and the brightness output signal at multivibrator 520 indicates adequate brightness and hence, skipped data. If the brightness level falls as it does in the presence of a void in the stack, the output of count generator 524 is inhibited and not applied to counter 508. Thus, count correction through the insertion of missing data caused by lack of contrast is achieved.

Figure 11:
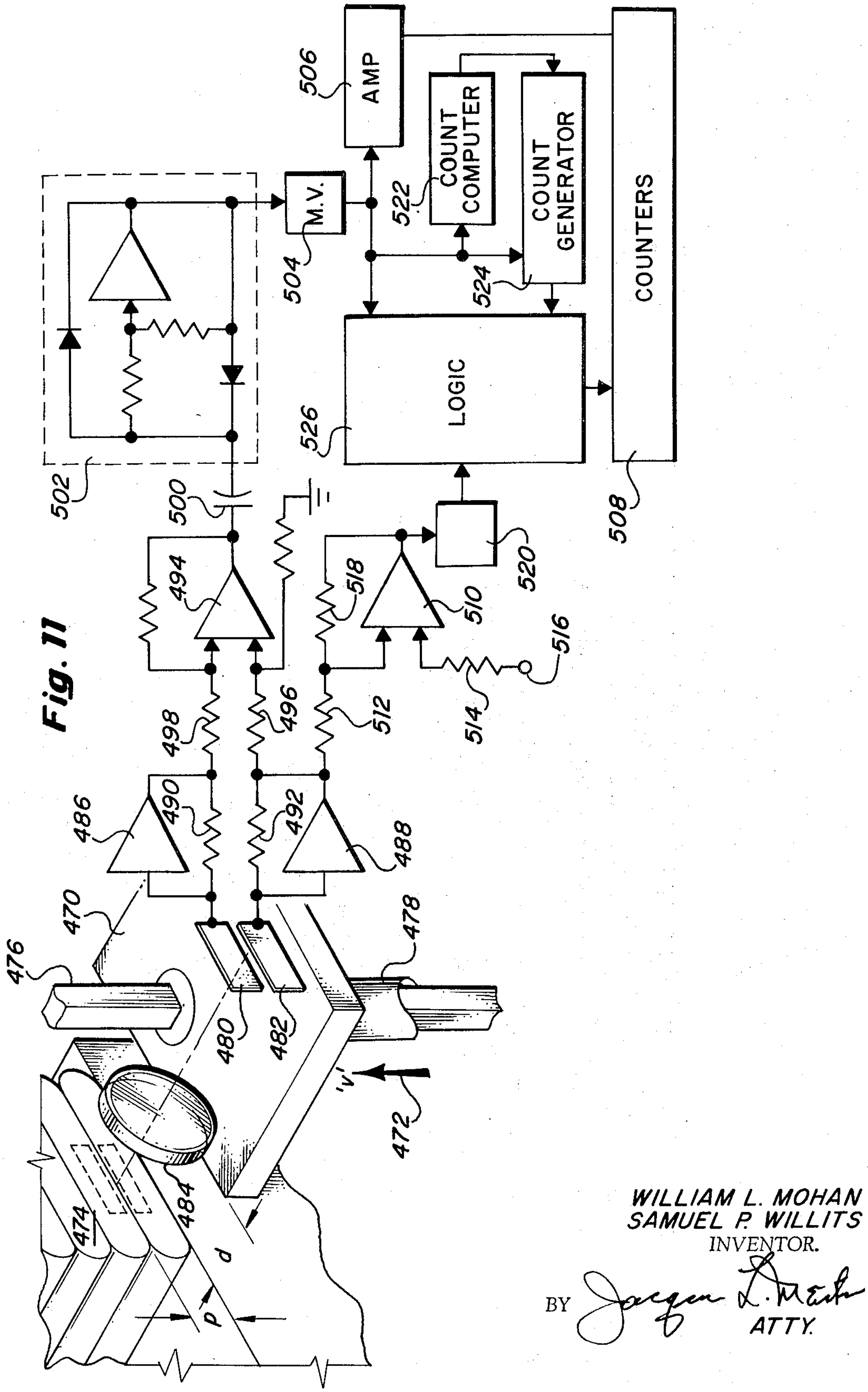
FIG. 11 is a mechanical-electrical schematic revealing a missed count correction feature of the inventive system.
Figure 12:
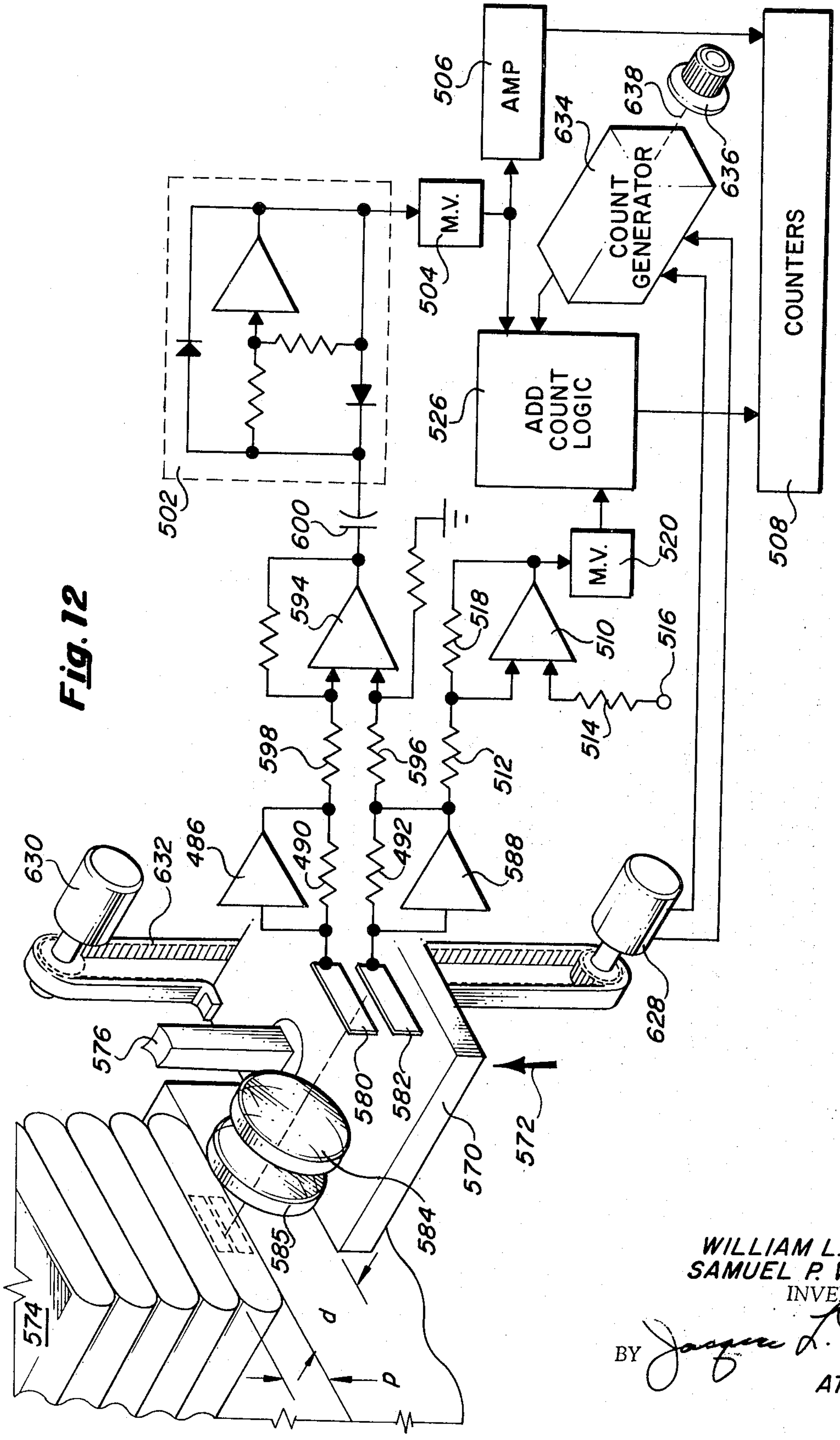

Another method of achieving count correction in a manner similar to that of FIG. 11 is shown in FIG. 12. Because of this similarity, circuit elements performing the same function as in FIG. 11 are designated by the same reference numeral in FIG. 12 — plus 100. In FIG. 12 the count computer is replaced by a tachometer 628 which generates an output voltage level proportional to the velocity of the sensor array as it traverses the stack 574 in the direction of arrow 572. The sensor array velocity is determined by motor 630 which is coupled to the sensor platform through a "timing" belt. Count generator 634 is a voltage controlled oscillator and generates an output pulse wavetrain proportional to the output voltage of tachometer 628 and as manually modified by an operator input — "gage size". Gage size is inserted by manually setting knob 636 in rough accord with the thickness of the material to be counted. Knob 636 is mechanically coupled to and electrically modifies the output of count generator 634. The resultant output pulse wavetrain from count generator 634 is as nearly identical to that generated by the sensors as is possible. Add count logic circuit 526 functions in a similar manner to that of FIG. 11 and inserts missed counts only where brightness is high enough to assure there were no voids in the stack. A field lens 585 placed at the front focus of objective lens 584, adequately collimates the image of the sensor array thus allowing for offsets in the stacked material without lost counts due to the offsets.

Figure 13:
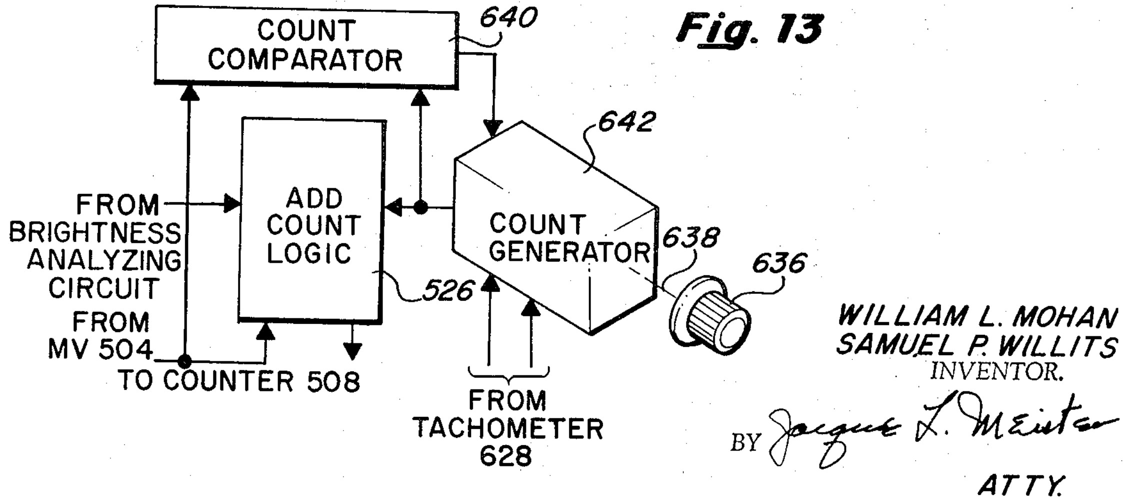
FIGS. 12 and 13 are schematics of another embodiment of a missed count correction system.

A refinement of the FIG. 12 method of achieving count correction is illustrated partially in FIG. 13. Those circuit elements that are missing are identical to those of FIG. 12. Count comparator 640 is connected to the output of bi-stable multivibrator 504 and continuously compares the pulse interval in that pulse train with that generated by count generator 642. Count generator 642 is similar to the count 634 of FIG. 12 in that it is a voltage controlled oscillator with its primary input control voltage being the output of tachometer 628 as modified by gage size established by know 636. The output of count comparator 640 is an error signal proportional to the difference between the optically generated output of multivibrator 504 and that established by tachometer 628 and knob 636. This error signal is fed to count generator 642 where it is used in a closed loop servo to modify the interval of oscillation of count generator 642 thus insuring that should the data output of generator 642 be required to correct for a missed count, its period will essentially be matched to the latest preceding real time data.

The foregoing description has been in terms of electro-optical sensors. However, any transducer may be employed that detects contrast gradients when pitch matched with individual ones of stacked elements. The particular sensor type chosen depends upon the material and contrast characteristics of the stacked objects and for certain materials, fluidic, magnetic, and capacitive transducers have proven advantageous.

The invention has been described in detail herein with particular reference to preferred embodiments thereof. It will be understood however that modifications and variations can be effected within the spirit and scope of the invention as described herein and as defined in the appended claims.

We claim:

1. In improved apparatus for counting the quantity of a plurality of similar objects stacked adjacent one another and not having special treatment to facilitate sensing or counting, the naturally occurring space varying characteristics of said stacked objects when scanned including one or more of the following components, a non-cyclical component representative of the average characteristic level over multiple ones of said stacked objects, a first low frequency cyclical component representative of gradual changes in the average characteristic level over multiple ones of said stacked objects, a second cyclical component representative of a natural characteristic of each of said stacked objects and having a single cycle for each of said objects and a third cyclical component representative of plural natural characteristics of each of said objects, comprising at least one sensor means comprising a sensor array, the effective width of each of said sensor means being correlated to the edge thickness of one of said similar stacked objects and equal to or less than the edge thickness of each object and more than 20 percent of the edge thickness of each object to effect pitch match filtering to suppress those frequency components in the sensor output signal that are representative of said third cyclical component and to enhance those frequency components that are representative of said second cyclical component, frame means supporting and connected to said sensor array for enabling relative movement between said sensor array and the edges of said stacked objects to thereby generate output signals from said sensor array indicative of said quantity, signal stripping circuit means connected to the output of said sensor array and responsive thereto to enhance the frequency component of said sensor output signals indicative of said second cyclical component representative of individual ones of said similar stacked objects to provide output counter driving signals indicative of the quantity of edges passing by said sensor array, and signal processing and counting means responsive to said counter driving signals to count the number of edges passing before said sensor array, the improvement comprising, substantially zero impedance amplifier means coupling said sensor array and said signal stripping circuit means.

2. Improved counting apparatus in accord with claim 1 further comprising a source of radiation a condensing lens focusing said radiation upon and illuminating said edges, an objective lens for imaging said sensor array on the illuminated area of said edges, the optical axes of said condensing lens and said objective lens each intersecting substantially at said edge, said axes being further positioned to lie in a common plane which is perpendicular to said edge and parallel to the stacking surfaces of said objects, said optical axes being displaced at substantially equal angles on opposite sides of a perpendicular to said edge.

3. Improved counting apparatus in accord with claim 1 further comprising a source of radiation, means for collimating the radiant energy emitted from said source, condensing lens means for focusing said collimated radiant energy upon said edges, said condensing lens having a focal length equal to or smaller than its effective diameter and an effective diameter greater than 5 times the width of said edge, objective lens means defining an optical axis perpendicular to and intersecting the optical axis of said condensing lens, said sensor array being located in the object plane of said objective lens, and beam splitter means interposed in the optical path of said condensing lens at the point of intersection of the optical axes of said condensing lens and said objective lens to thereby maintain the angle of both axes to said edges, substantially coincident.

4. Improved counting apparatus in accord with claim 1 wherein said sensor array comprises at least two sensor means.

5. Improved counting apparatus in accord with claim 4 further comprising a source of radiation, and radiation filter means interposed between said radiation source and said edges and between said edges and one of said sensor means comprising said sensor array, said radiation filter means being selected to restrict the responsiveness of said one of said sensor means to the filtered radiation impinging upon said edges from said source of radiation, the output of said sensor array being of one polarity when exposed to said filtered radiation and of opposite polarity when exposed to ambient surround.

6. Improved counting apparatus in accord with claim 5 further comprising signal processing circuit means connected at its inputs to said sensor array for combining the outputs of said sensor means to provide a differentially combined output signal, level reference amplifier means connected to said signal processing circuit means and responsive to said differentially combined output signals thereof to provide an output when said sensor array is exposed to said ambient surround, and clamping means responsive to the output signal of said level reference amplifier means to inhibit counting.

7. Improved counting apparatus in accord with claim 1 further comprising a source of high pressure air, and objective lens means for imaging said sensor array on said edges, and nozzle means for directing the flow of said high pressure air substantially normal to said stacked objects in the area adjacent that viewed by said objective lens means.

8. Improved counting apparatus in accord with claim 7 wherein the diameter of said nozzle means is between 0.020 and 0.100 inches, said nozzle being maintained at a distance from the edges of said stacked objects between 0.025 and 0.50 inch, said high pressure air being maintained between 10 and 50 p.s.i..

9. In improved apparatus for counting the quantity of a plurality of similar objects stacked adjacent one another and not having special treatment to facilitate sensing or counting, the naturally occurring space varying characeteristics of said stacked objects when scanned including one or more of the following components, a non-cyclical component representative of the average characteristic level over multiple ones of said stacked objects, a first low frequency cyclical component representative of gradual changes in the average characteristic level over multiple ones of said stacked objects, a second cyclical component representative of a natural characteristic of each of said stacked objects and having a single cycle for each of said objects and a third cyclical component representative of plural natural characteristics of each of said objects, comprising at least one sensor means comprising a sensor array, the effective width of each of said sensor means being correlated to the edge thickness of one of said similar stacked objects and equal to or less than the edge thickness of each object and more than 20 percent of the edge thickness of each object to effect pitch match filtering to suppress those frequency components in the sensor output signal that are representative of said third cyclical component and to enhance those frequency components that are representative of said second cyclical component, frame means supporting and connected to said sensor array for enabling relative movement between said sensor array and the edges of said stacked objects to thereby generate output signals from said sensor array indicative of said quantity, signal stripping circuit means connected to the output of said sensor array and responsive thereto to enhance the frequency component of said sensor output signals indicative of said second cyclical component representative of individual ones of said similar stacked objects to provide output counter driving signals indicative of the quantity of edges passing by said sensor array, and signal processing and counting means responsive to said counter driving signals to count the number of edges passing before said sensor array, the improvement comprising, substantially zero impedance amplifier means coupling said sensor array and said signal stripping circuit means, a source of radiation, a condensing lens focusing said radiation upon and illuminating said edges, said condensing lens having a focal length equal to or smaller than its diameter and an effective diameter greater than 5 times the edge thickness of each of said stacked objects, an objective lens for imaging said sensor array on the illuminated area of said edges, the optical axes of said condensing lens and said objective lens each intersecting substantially at said edge, said axes being further positioned to lie in a common plane which is perpendicular to said edge and parallel to the stacking surfaces of said objects, said optical axes being displaced at substantially equal angles on opposite sides of a perpendicular to said edge.

10. In improved apparatus for counting the quantity of a plurality of similar stacked objects adjacent one another comprising means for imaging one or more sources of electro-magnetic radiation on said similar stacked objects, at least one sensor means comprising a sensor array, the effective width of detection of each of said sensor means being between 20 percent and 100 percent of the thickness of each of said similar stacked objects, frame means supporting and connected to said one or more sources of electro-magnetic radiation and said sensor array, said frame means enabling relative movement between said radiation sources and sensor array and the edges of said stacked objects to thereby generate output signals from said sensor array indicative of said quantity, a signal stripping circuit connected to the output of said sensor array and responsive thereto to strip out the highest frequency signal component thereof and provide output counter driving signals indicative of the quantity of edges passing by said sensor array, and signal processing circuit means and counting means responsive to said counter driving signals to count the number of edges passing before said sensor array, the improvement comprising, said electromagnetic radiation sources comprising at least one pair of said radiation sources, each of said radiation sources having a narrow band spectral emission in two different bands, and said sensor array comprises a sensor means for each of said radiation sources and band pass radiation filter means for each of said sensor means, said filter means having its band pass region matched to the spectral emission characteristics of said radiation sources.

11. Improved counting apparatus in accord with claim 10 wherein said imaging means further comprises slit means interposed between each of said radiation sources and said similar stacked objects, the image of each of said slit means on said similar stacked objects being between 20 percent and 100 percent of the thickness of each of said similar stacked objects.

12. Improved counting apparatus in accord with claim 11 further comprising differential amplifier means for adding the signals of each of said sensor means corresponding to a pair of said radiation sources to thereby generate said sensor output signals.

13. In improved apparatus for counting the quantity of similar stacked objects adjacent one another and not having special treatment to facilitate sensing or counting, the naturally occurring space varying characteristics of said stacked objects when scanned including one or more of the following components, a non-cyclical component representative of the average characteristic level over multiple ones of said stacked objects, a first low frequency cyclical component representative of gradual changes in the average characteristic level over multiple ones of said stacked objects, a second cyclical component representative of a natural characteristic of each of said stacked objects and having a single cycle for each off said objects and a third cyclical component representative of plural natural characteristics of each of said objects, comprising means for imaging one or more sources of electro-magnetic radiation on said similar stacked objects, at least one sensor means comprising a sensor array, the effective width of detection of each of said sensor means being correlated to the edge thickness of one of said similar stacked objects and equal to or less than the edge thickness of each object and more than 20 percent of the edge thickness of each object, frame means supporting and connected to said one or more sources of electro-magnetic radiation and said sensor array, said frame means enabling relative movement between said radiation sources and said sensor array and the edges of said stacked objects to thereby generate output signals from said sensor array indicative of said quantity, a signal stripping circuit means connected to the output of said sensor array and responsive thereto to enhance the frequency component of said sensor output signals indicative of said second cyclical component representative of individual ones of said similar stacked objects to provide output counter driving signals indicative of the quantity of edges passing by said sensor array, and signal processing circuit means and counting means responsive to said counter driving signals to count the number of edges passing before said sensor array, the improvement comprising, actuator means for moving said frame means at a substantially constant velocity past and at a substantially fixed distance from said similar stacked objects, pulse train generating means comprising count computing and generating means connected to the output of said stripping circuit to generate a pulse train whose frequency and phase are controlled by and synchronous with said output counter driving signals, brightness analyzing means for providing a first brightness signal indicative of said sensor array scanning said similar stacked objects and a second brightness signal when said sensor array is not scanning said similar stacked objects, and logic means connected to said pulse train generating means, said signal processing circuit means and said brightness analyzing means and responsive to interruptions in the output of said signal processing circuit to couple the output of said pulse train generating means to said counting means whenever said first brightness signal is present.

14. In improved apparatus for counting the quantity of similar stacked objects adjacent one another and not having special treatment to facilitate sensing or counting, the naturally occurring space varying characteristics of said stacked objects when scanned including one or more of the following components, a non-cyclical component representative of the average characteristic level over multiple ones of said stacked objects, first low frequency cyclical component representative of gradual changes in the average characteristic level over multiple ones of said stacked objects, a second cyclical component representative of a natural characteristic of each of said stacked objects and having a single cycle for each of said objects and a third cyclical component representative of plural natural characteristics of each of said objects, comprising means for imaging one or more sources of electromagnetic radiation on said similar stacked objects, at least one sensor means comprising a sensor array, the effective width of detection of each of said sensor means being correlated to the edge thickness of one of said similar stacked objects and equal to or less than the edge thickness of each object and more than 20 percent of the edge thickness of each object, frame means supporting and connected to said one or more sources of electromagnetic radiation and said sensor array, said frame means enabling relative movement between said radiation sources and said sensor array and the edges of said stacked objects to thereby generate output signals from said sensor array indicative of said quantity, a signal stripping circuit means connected to the output of said sensor array and responsive thereto to enhance the frequency component of said sensor output signals indicative of said second cyclical component representative of individual ones of said similar stacked objects to provide output counter driving signals indicative of the quantity of edges passing by said sensor array, and signal processing circuit means and counting means responsive to said counter driving signals to count the number of edges passing before said sensor array, the improvement comprising, actuator means for moving said frame means at a substantially constant velocity past and at a substantially fixed distance from said similar stacked objects, means for generating a pulse train whose frequency and phase are synchronous with said output counter driving signals comprising generator means for generating a D. C. voltage proportional to the rate of said output counter driving signals, and voltage controlled keyed oscillator means connected to said generator means and said output counter driving signals for generating said synchronous pulse train, said oscillator means providing a pulse repetition rate proportional to said D. C. voltage and in synchronous coincidence with said output counter driving signals, brightness analyzing means for providing a first brightness signal indicative of said sensor array scanning said similar stacked objects and a second brightness signal when said sensor array is not scanning said similar stacked objects, and logic means connected to said pulse train generating means, said signal processing circuit means and said brightness analyzing means and responsive to interruptions in the output of said signal processing circuit to couple the output of said pulse train generating means to said counting means whenever said first brightness signal is present.

15. Improved counting apparatus in accord with claim 14 wherein said generator means comprises a tachometer which generates a D.C. output voltage proportional to the velocity of the sensor array past said similar stacked objects and said voltage controlled keyed oscillator means is further provided with manual adjustment means for modifying its output in accord with the thickness of the material to be counted.

16. Improved counting apparatus in accord with claim 15 further comprising count comparator means for comparing the output pulse train of said voltage controlled keyed oscillator means to said output counter driving signals and provide an error signal indicative of the difference therebetween, and means within said voltage controlled oscillator means connected to said count comparator means and responsive to the error signal therefrom to modify said synchronous pulse train to reduce said error signal.

17. In a method for counting the quantity of a plurality of similar objects arranged in a stack, the steps of illuminating the edges of said similar stacked objects with radiation of selected spectral characteristics different than ambient, positioning a pair of radiation sensors comprising an array so as to be imaged on the edges of said similar stacked objects, the effective width of detection of each of said sensors being between 20 percent and 100 percent of the thickness of one of said similar stacked objects, one of said sensors being responsive to ambient illumination and the other being responsive only to illumination of said selected spectral characteristics, electrically combining the outputs of said sensors in differential, effecting relative movement between said edges and said radiation sensors to thereby generate output signals from said sensor pair of a given polarity while both are imaged on the edges and of an opposite polarity when said sensor responsive to ambient illumination is no longer imaged on said edges and is exposed to ambient illumination, selectively filtering said output signals to enhance a frequency component thereof producing slope reversals that are indicative of individual ones of said similar stacked objects to thereby provide a pulse train output wherein the total quantity of pulses is equal to the quantity of slope reversals and the quantity of said similar stacked objects, and inhibiting said pulse train whenever the polarity of said output signals indicates said ambient sensitive sensor is exposed to ambient illumination.

18. In a method for counting the quantity of similar objects arranged in a stack, the steps of illuminating the edges of said similar stacked objects with at least two adjacent strips of radiation of different spectral characteristics, the width of each illuminated strip being between 20 percent and 100 percent of the thickness of one of said similar stacked objects, the width axis of each of said illuminated strips being disposed substantially parallel to the thickness axis of each of said similar stacked objects, imaging each of said illuminated strips on said edges upon radiation sensor means responsive to the strips radiation spectral characteristics, effecting relative movement between said edges and both said strips of radiation and said sensors, to thereby generate output signals having components indicative of a contrast characteristic associated with individual ones of said similar stacked objects, electrically combining the outputs of said sensors in differential, and selectively filtering said output signals to enhance a frequency component thereof indicative of individual ones of said similar stacked objects to thereby provide a pulse train wherein the total quantity of pulses is equal to the quantity of said similar stacked objects.

19. A method for counting the quantity of a plurality of similar objects arranged in a stack, comprising the steps of imaging a sensor pair on the edges of said similar stacked objects and matching the effective width of each sensor pair to the thickness of individual ones of said similar stacked objects, said sensors being electrically connected in differential, the effective width of each sensor being between 20 percent and 100 percent of the thickness of one of said similar stacked objects, effecting relative movement between said sensor pair and the edges of said similar stacked objects at a substantially constant rate while maintaining the width axis of said sensor array substantially parallel to the thickness axis of each of said similar stacked objects to thereby generate output signals to provide a first pulse train wherein the pulse rate is equal to the rate of sensor passage past said similar stacked objects, generating an auxiliary pulse train in synchronism with said first pulse train, analyzing the brightness level associated with said sensor output signals to provide a brightness signal indicative of whether or not said sensor pair is imaged upon said edges, and substituting a pulse from said auxiliary pulse train for any missing pulses in said first pulse train whenever said brightness signal indicates said sensor pair is imaged upon said edges.

20. The method for counting set forth in claim 19 further comprising the steps of comparing the characteristics of said first pulse train with those of said auxiliary pulse train and providing an error signal indicative of any difference therebetween, and adjusting the characteristics of said auxiliary pulse train in accord with said error signal to bring said auxiliary pulse train into synchronism with said first pulse train.

* * * * *